March 13, 1934.   H. T. THOMAS   1,950,580
AUTOMATIC VARIABLE SPEED TRANSMISSION
Filed Jan. 16, 1933   2 Sheets-Sheet 1

Inventor
Horace T. Thomas
By Whittemore Hulbert Whittemore & Belknap
Attorneys

March 13, 1934.    H. T. THOMAS    1,950,580
AUTOMATIC VARIABLE SPEED TRANSMISSION
Filed Jan. 16, 1933    2 Sheets-Sheet 2
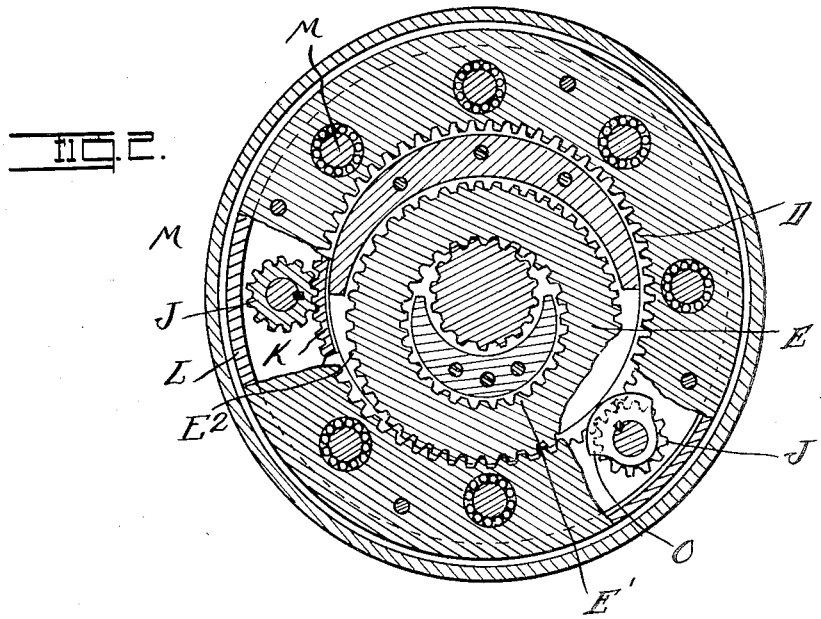
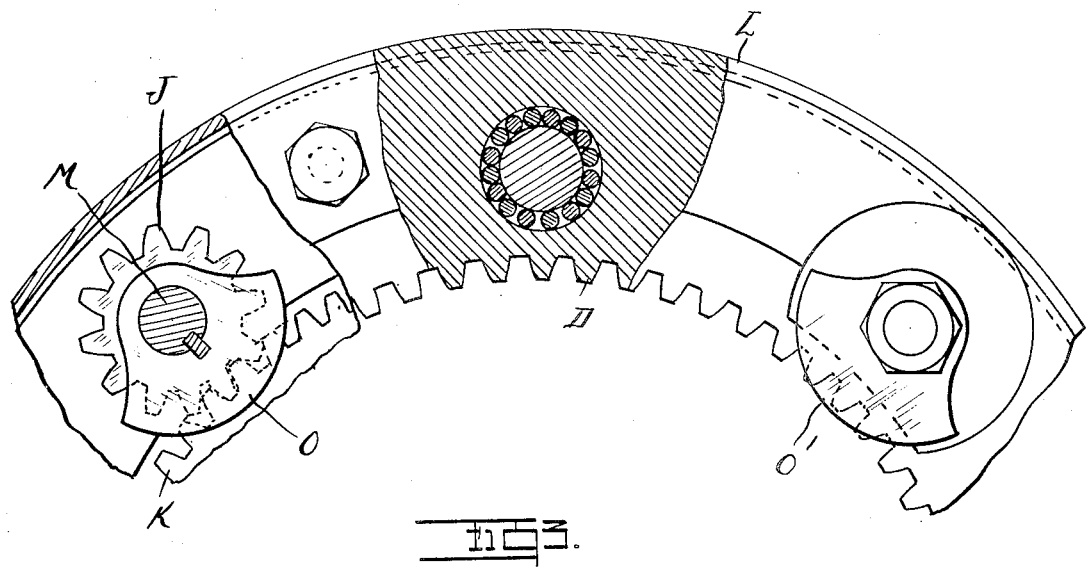
Inventor
Horace T. Thomas
By  Whittemore Hulbert
    Whittemore & Belknap
              Attorneys Patented Mar. 13, 1934

1,950,580

UNITED STATES PATENT OFFICE 1,950,580

AUTOMATIC VARIABLE SPEED TRANSMISSION

Horace T. Thomas, Lansing, Mich., assignor to Reo Motor Car Company, Lansing, Mich., a corporation of Michigan Application January 16, 1933, Serial No. 652,084

4 Claims. (Cl. 74—34)

The invention relates to variable speed transmission mechanism of that type comprising a planetary reduction gear train between the drive and driven members, together with means governed by the speed of the driven member for automatically progressively retarding the planetary action until the whole gearing rotates at high speed. To thus retard the planetary action it is usual to provide friction means which is thrown into action by centrifugal force. This has the objection, first, that the energy consumed by friction is converted into heat and performs no useful work; second, that the frictionally engaged parts are subject to wear; third, that the heat generated must be dissipated.

The present invention is designed to accomplish the automatic control with a minimum loss of energy and to this end the invention consists in the construction as hereinafter set forth.

In the drawings:

Fig. 2 is a cross section on line 2—2 of Fig. 1;

Fig. 3 is an enlarged sectional elevation of portions of the structure shown in Fig. 2.

Figure 1:
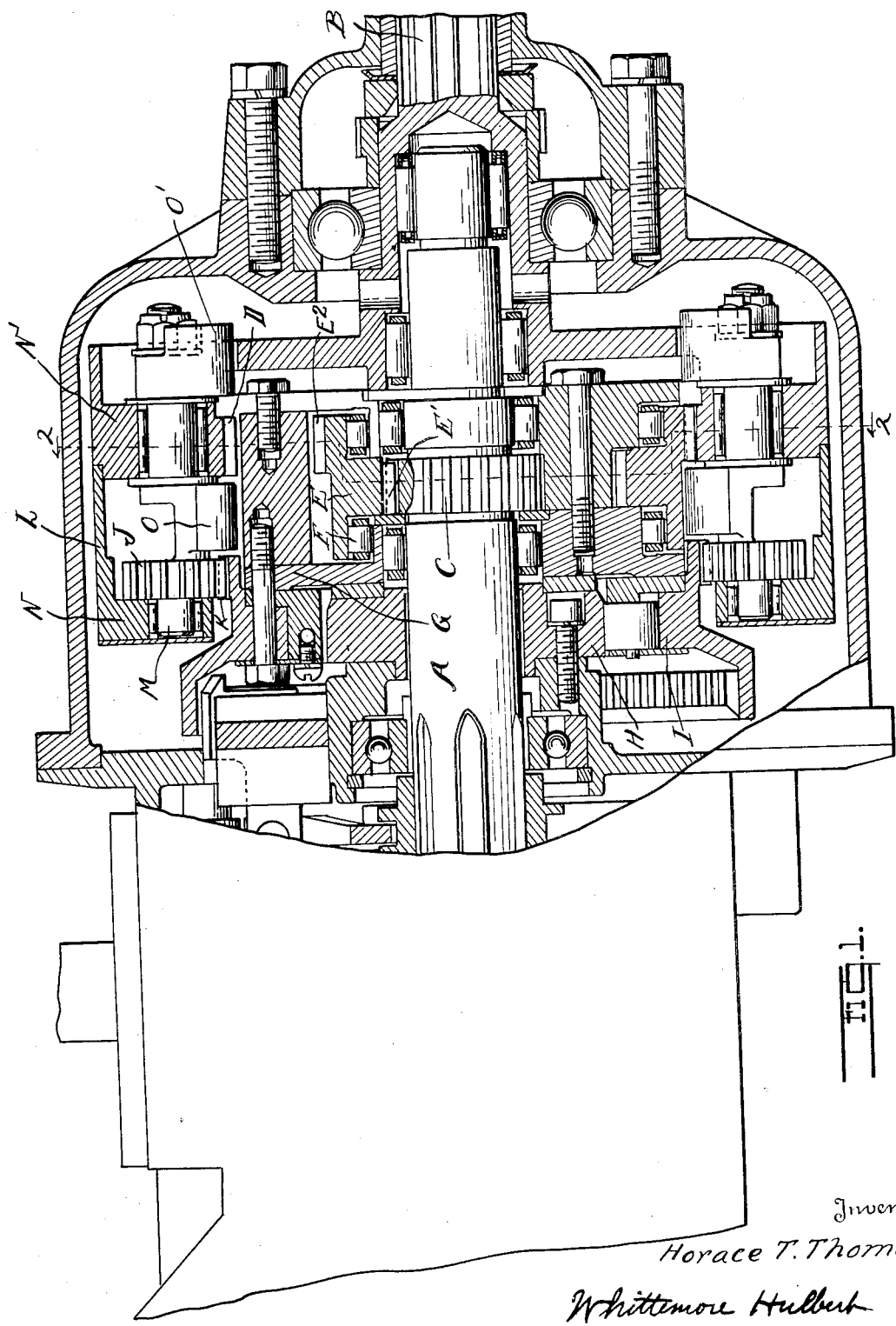
Fig. 1 is a longitudinal section through the improved automatic variable speed transmission.

In detail, A is the drive shaft, B is a driven shaft in axial alignment therewith, C is a sun gear on the drive shaft, D is an internal gear on the driven shaft, E is a planetary ring gear having internal teeth E' in mesh with the sun gear C and external teeth $E^2$ in mesh with the internal gear D. This planetary ring gear is mounted on roller bearings F upon a gear carrier G which latter is rotatively mounted upon a stationary member H through the medium of an overrunning clutch I. This overrunning clutch prevents rotation of the member G in a direction reverse to the direction of rotation of the members C, D and E, but does not interfere with rotation in the same direction.

With the parts as thus far described it is evident that rotary motion communicated from the shaft A to the sun gear C will be transmitted through the planetary gear E to the internal gear D which latter is rotated in the same direction at a reduced speed. To compel the rotation of the gear wheel D at the same angular speed as the sun gear C, it is necessary to couple the member D with the member G. If, however, it is desired to gradually change the ratio between the angular speed of the sun gear C and the internal gear D, it is necessary to gradually accelerate the rotation of the member G until it attains the same angular speed as the member D.

To accomplish this gradual acceleration and with a minimum loss of energy, the following construction is provided:

Mounted upon the driven member D is a series of pinions J which are arranged in the plane of the member G and engage external gear teeth K formed thereon. As shown, the gear wheel has a drum L mounted thereon and extending laterally over the member G and the pinions J are mounted on shafts M which are journaled in bearings N and N' on this drum. O and O' are eccentric counterweights secured to the shafts M and which are compelled to rotate with said shaft and the pinions J. Thus assuming that the member G is stationary, the rotation of the member D and drum L attached thereto will carry the pinions J through an orbital movement around the member G and as these pinions are in mesh with the external gear teeth K, such orbital movement will cause the rotation of the pinions about their own axes. This in turn will cause the rotation of the shafts M and counter-weights O and O' mounted thereon. The rotation of the drum L with the driven gear D will develop centrifugal force in the counter-weights O' tending to move these weights radially outward and resisting movement radially inward. This centrifugal force is relatively light when the drum L is revolving at low speed but as centrifugal force increases according to the square of the revolutions it rapidly builds up when the speed of the drum L is increased. Thus during each revolution of each of the pinions J and shafts M connected therewith, the counter-weights O and O' will increase the revolving force during one-half of the revolution and will resist the revolving force during the other half revolution. Inasmuch, however, as the planetary gear carrier G can not revolve in reverse direction due to the overrunning clutch I, and as the rotary speed of the pinions must remain constant whenever the rotation of the drum L is constant, it is evident that the centrifugal force of the weights O O' acting through the shafts M and pinions J will tend to accelerate or increase the driving force for the drum L during one-half revolution of the pinion and will act to rotate the member G in the same direction as the drum during the other half of the revolution. This will cause a change in the driving ratio between the sun gear C and the internal gear D in the direction of increase of speed in the driven member.

When the transmission is loaded as for instance when it is used in a motor vehicle, the rotation of the shaft A will be first transmitted to the driven shaft B to develop the highest torque and the lowest speed in the latter. As the speed of the vehicle and the driven shaft B increases, the rotation of the drum L will increase the centrifugal force in the counter-weights O and O' and as before stated, this will drive the gear carrier G forward during one-half of each revolution of the pinions J. Such forward rotation of the carrier G will diminish the differential in speed and torque between the shafts A and B, tending to increase the speed of the driven shaft. This in turn will increase the speed of rotation of the drum L increasing centrifugal force on the counter-weights O and O' which react to further increase the rotation of the gear carrier G and the progressive action continuous until finally a speed is attained where the counter-weights O and O' remain in their outermost positions, stopping all rotation of the pinions J about their axes and compelling the whole gear assembly to rotate as a unit.

Inasmuch as the resistance to rotation of the pinions J is due solely to centrifugal force, the frictional losses will be at a minimum so that the greater part of the energy of the driving shaft will be transmitted to the driven shaft. This is not only an increase in efficiency but also diminishes wear of parts and avoids the necessity of special provision for dissipating heat such as is necessary where the acceleration of the gear carrier is through the medium of a friction clutch.

What I claim as my invention is:

1. In a variable speed transmission, the combination with rotary driving and driven members, of a step-down planetary transmission therebetween including an intermediate member and a one-way clutch for holding the same from reverse rotation, a rotary member mounted on and travelling with said driven member to have an orbital movement about said intermediate member, a gear connection between said intermediate member and rotary member to rotate the latter during its orbital movement, and a weight eccentrically mounted on said rotary member operating by centrifugal force developed by said orbital movement to resist rotation about the axis of said rotary member, and to thereby drive forward said intermediate member.

2. In a variable speed transmission, the combination with rotary drive and driven members, of a step-down planetary transmission therebetween including an intermediate member and a one-way clutch for holding the same from reverse rotation while permitting forward rotation, a series of rotary members mounted on the driven member and arranged for orbital movement about said intermediate member, pinions on each of said rotary members, a gear wheel on said intermediate member in mesh with said pinions to cause the rotation of the same during the orbital movement thereof, and eccentric weights on each of said rotary members adapted to resist axial rotation during orbital movement thereof and to thereby drive said intermediate member forward.

3. In a variable speed transmission, the combination with rotary drive and driven members, of a step-down planetary transmission therebetween comprising a sun gear, a concentric internal gear, an intermediate planetary gear and a planetary gear carrier, a one-way clutch for holding said planetary gear carrier from reverse rotation, a series of members rotatively mounted upon said internal gear wheel and extending over said planetary gear carrier to have an orbital movement concentric therewith, gear teeth on said planetary gear carrier and pinions on said rotary members in mesh therewith to be revolved thereby during orbital movement thereabout, eccentric weights on said rotary members adapted during said orbital movement to centrifugally resist rotation and to thereby propel said planetary gear carrier forward.

4. In a variable speed transmission, the combination with rotary drive and driven members, of a step-down planetary gearing therebetween comprising a sun gear on said drive member, an internal gear on said driven member, a planetary gear therebetween, a planetary gear carrier and a one-way clutch for resisting reverse rotation of said planetary gear carrier while permitting forward rotation thereof, a drum secured to said internal gear wheel and extending over said planetary gear carrier, a series of rotary members mounted in said drum to have an orbital movement therewith, pinions on each of said rotary members, peripheral gear teeth on said planetary gear carrier in mesh with said pinions to drive the same during the rotation of said drum, and eccentric weights for each of said rotary members adapted to centrifugally resist rotation thereof in proportion to the speed of said driven member and to thereby accelerate said planetary gear carrier in a forward direction until it attains the speed of said driven member.

HORACE T. THOMAS.